UNITED STATES PATENT OFFICE.

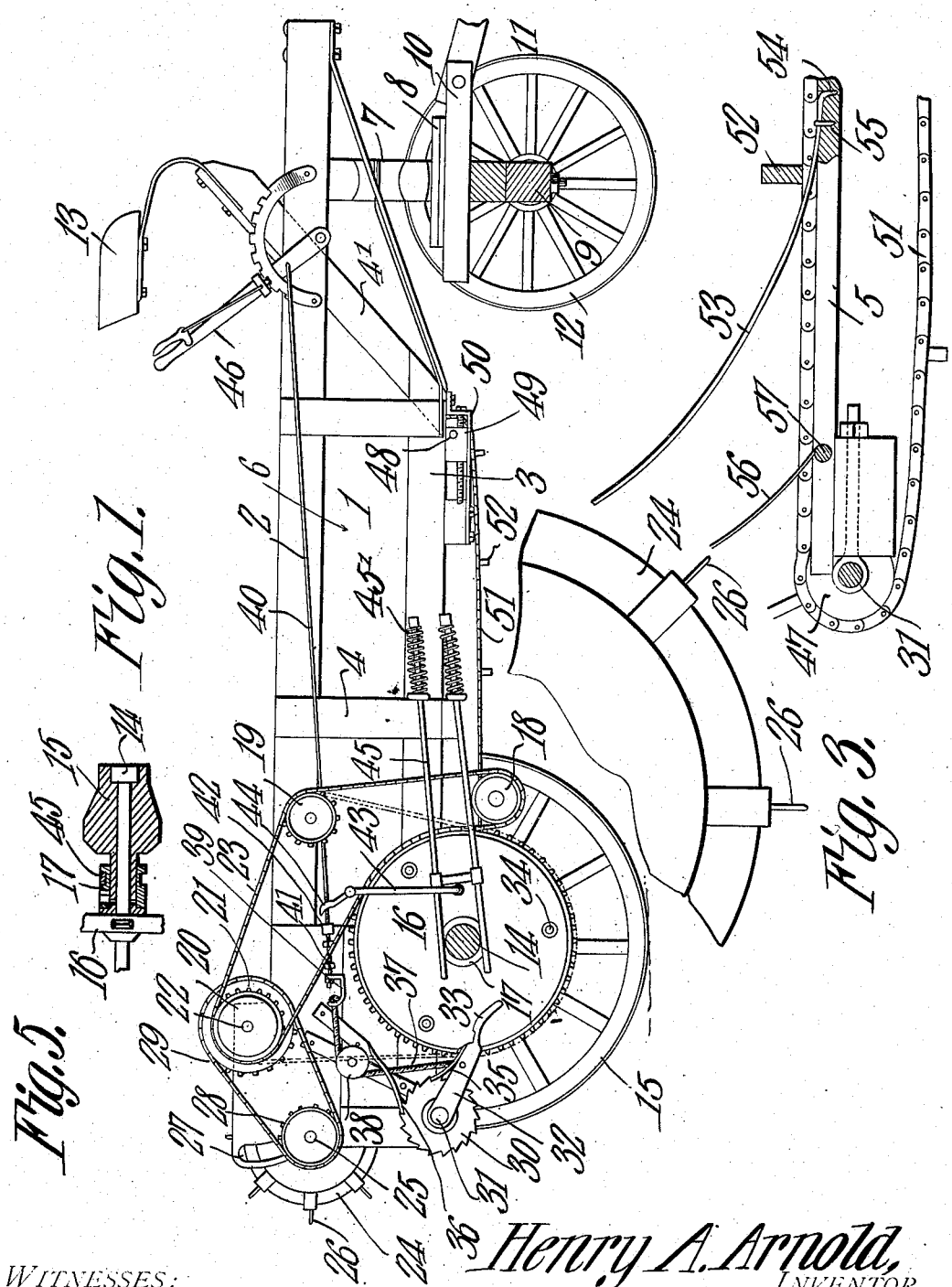

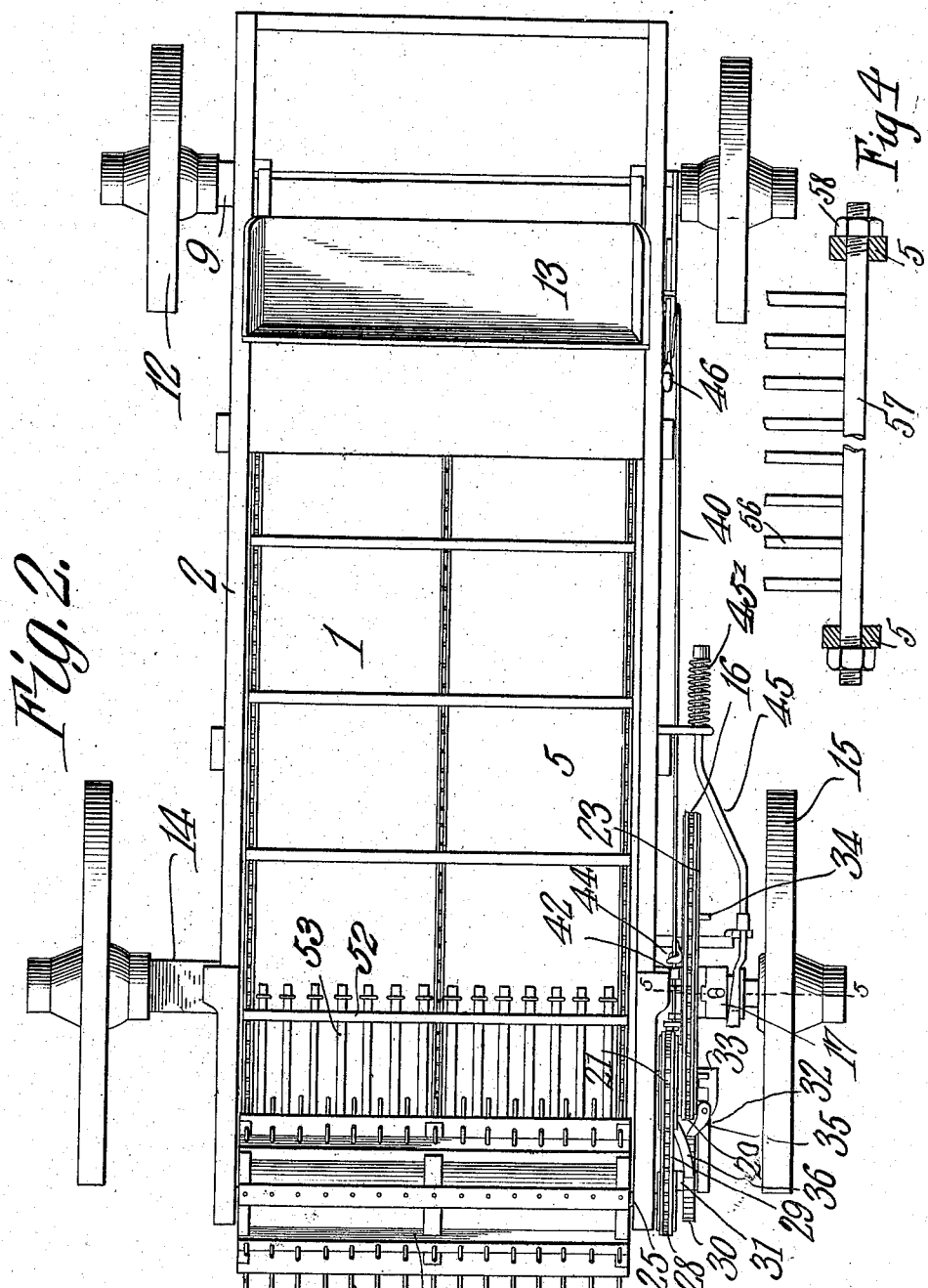

HENRY A. ARNOLD, OF LAKE GENEVA, WISCONSIN.

COMPOST-SPREADER.

No. 885,217.  Specification of Letters Patent.  Patented April 21, 1908.

Application filed May 6, 1907. Serial No. 372,156.

*To all whom it may concern:*

Be it known that I, HENRY A. ARNOLD, a citizen of the United States, residing at Lake Geneva, in the county of Walworth and State of Wisconsin, have invented a new and useful Compost-Spreader, of which the following is a specification.

This invention has relation to compost spreaders and it consists in the novel construction and arrangement of its parts as hereinafter shown and described.

The object of the invention is to provide a spreader such as indicated which is provided with a traveling conveyer mounted upon its bottom and adapted to work or force the material toward the rear end of the apparatus.

At the rear end of the apparatus is mounted a rotating distributing cylinder and means is provided for rotating said cylinder in either direction in order that it may operate as an over or under-cast distributer.

Means of novel arrangement is provided for regulating the rate at which the conveyer will move and means is also provided for throwing the said conveyer and distributer simultaneously out of gear.

A comb or apron is mounted upon the bottom of the body of the spreader and coöperates with the distributer in breaking the material and reducing the lumps thereof to such dimension as to be readily ejected from the spreader without increasing the draft or strain upon the draft animals. Said comb or apron also coöperates with the conveyer for bringing the material into proper position with relation to the spreader. A supplemental comb or apron, such as above indicated, may be employed when desired and is preferable as a reinforcing means for the primary comb when exceptionally tough or frozen material is being operated upon.

The body of the spreader is of such design that it will hold a maximum quantity of material in such manner as to deliver the same readily to the conveyer and while supporting wheels of usual diameter are employed the body is low down and may be readily loaded without requiring excessive manual pitching of the material.

Means is also provided whereby the spreader may readily ride over frozen and unusually tough material as will hereinafter appear.

In the accompanying drawing:—Figure 1 is a side elevation of the spreader. Fig. 2 is a top plan view of the same, Fig. 3 is a side elevation of the rear portion of the bottom of the spreader body partly in section. Fig. 4 is a sectional view showing the manner of securing a comb supporting rod to the spreader bottom. Fig. 5 is a detailed sectional view of a clutch mechanism used upon the spreader.

The spreader consists of the body 1 which is substantially bateau-shaped in general configuration. The longitudinally disposed beams 2 are located at the upper long edges of the said body while the beams 3 are located under the beams 2 at the lower long edges of the body. The studs 4, 4 connect the beams 2 and 3 together, the studs 4′, at the forward end of the body 1, being in inclined positions. The bottom 5 is located between the beams 3, 3 and the sides 6 are located within the beams 2 and 3 and the studs 4. The bottom 5 at the forward end of the body 1 is inclined in alinement with the longitudinal axes of the studs 4′ which makes a body of general shape similar to that of a bateau. The bolster 7 is located under the forward extended ends of the beam 2 and rests upon the fifth wheel 8 which in turn is mounted upon the axle 9 provided with the hounds 10 and tongue 11. The wheels 12 are supported by the axle 9 and the said wheels are of such diameter that their upper sides lie between the upper and lower edges of the body 1. By reason of the shape of the said body, however, the said wheels may be readily turned laterally, together with the axle, without interference on the part of the body. Also, wheels of large diameter may be employed which reduce to a minimum the traction leverage or strain upon the draft animals for effecting rotation. The operator's seat 13 is mounted at the forward end of the body 1. The rear portion of the body 1 is mounted upon the axle 14 and the traction wheel 15 is journaled upon the said axle. The sprocket wheel 16 is also journaled upon the axle 14. The clutch 17 is mounted upon the hub of the traction wheel 15 and rotates with the same and may slide laterally upon the hub toward and away from the sprocket wheel 16. The sprocket wheel 18 is journaled at the side of the body 1 in alinement with the sprocket wheel 16. The sprocket wheel 19 is similarly journaled but is positioned vertically above the sprocket wheel 18. The sprocket wheel 20 is attached to the side of the sprocket wheel 21. The said sprocket wheels 20 and 21, (when employed) are journaled upon the pin 22 which in turn is mounted upon the body 1. The sprocket wheel 20 lies in the same plane with the sprocket wheels 16, 18 and 19, and the sprocket chain 23 passes around the sprocket wheel 20, engages the sprocket of the wheel 16, thence, around the wheel 18 and over wheel 19, back to the said sprocket wheel 20.

The spreader 24 is of cylindrical configuration and is provided with a shaft 25 and upon its periphery with the radially extending fingers 26. The end portions of the shaft 25 are journaled in the arcuate slots or grooves 27 provided in the frame of the body 1. The arcs of the said slots 27 are struck from the center of the pin 22. Thus the shaft 25 may move along the said slots 27 without varying the distance between the said shaft and the pin 22. The sprocket wheel 28 is fixed to the shaft 25 and lies in the same plane as a sprocket wheel 21. The sprocket chain 29 passes around the wheels 21 and 28. The ratchet wheel 30 is fixed upon the shaft 31 which is also mounted upon the body 1. The lever 32 is fulcrumed at one end to the shaft 31 and is provided at its opposite end with a curved or arcuate portion 33 which normally lies in the path of the laterally disposed roller projections 34 mounted upon the side of the sprocket wheel 16. The pawl 35 is carried by the lever 32 and is adapted to engage the ratchets of the wheels 30. The pawl 36 is mounted upon the body 1 and is also adapted to engage the ratchets of the wheel 30. A chain or similar flexible element is attached at one end to the lever 32 and passes over a pulley 38 journaled to the side of the body 1 and connects at its opposite end with a clip 39 which is adjustably connected with the end of the rod 40 by means of the nuts 41 which are screw threaded upon the said rod and which receive the end of the said clip between them. An adjustable stop 42 is mounted upon the rod 40. The rocker 43 is pivoted upon the body 1 and is provided with an eye 44 which receives the rod 40 and is located in the extreme end of the path of the stop 42. The lower end of the rocker 43 connects with the spring actuated rods or bars 45 which in turn are operatively connected with the clutch 17. The forward end of the rod 40 is connected with the pawl and ratchet lever 46 which is fulcrumed to the side of the body 1 in the vicinity of the operator's seat 13. The shaft 31 is journaled at the rear end of the bottom 5 of the body 1 and is provided at intermediate points with the sprocket wheels 47, the upper and lower sides of which lie above and below the upper and lower sides of the said bottom 5. A shaft 48 is journaled in the adjustable bearings 49 which are located at the forward end of the bottom 5 of the body 1 and under the inclined portion of the said body. The shaft 48 is provided with the sprocket wheels 50 which correspond in number with the sprocket wheels 47 and are in alinement therewith. The chains 51 pass around the sprocket wheels 47 and 50 and hence they surround the bottom 5 of the body 1. The said chains are connected together transversely by means of the cross slats 52.

The comb or apron above referred to for holding material in proper position with relation to the spreader consists of a series of spring teeth or strips 53 which are provided at their lower end with the angularly disposed portions 54. The portions 54 are driven in the bottom 5 of the body 1 and the staples 55 are also driven in the bottom 5 and straddle the teeth 53. The free ends of the teeth 53 are disposed toward the spreader 24. The teeth 53 are located between the chains 51. The supplemental teeth 56 are located under the teeth 53. The teeth 56 are also disposed toward the spreader 24 and are preferably mounted upon a cross shaft 57 journaled in the bottom 5 and which may be partially rotated therein.

The operation of the spreader is as follows:— If it is intended that the spreader 24 operate as an over-cast the chain 23 is brought into engagement with the sprockets of the wheel 16 at the upper side thereof, when as the loaded body 1 is moved over the surface of the ground the traction wheel 15 is rotated which through the clutch 17 transmits rotary movement to the sprocket wheel 16. As the chain 23 engages the sprockets of the said wheel 16 at the upper side thereof the lower portion of the said chain moves toward the sprocket wheel 16 and the upper portion of the chain 23 moves toward the sprocket wheel 20. Thus the sprocket wheels 20 and 21 are rotated in the opposite direction to that in which the wheels 15 and 16 are rotating. Rotary movement is transmitted from the wheel 21 through the chain 29 and sprocket wheel 28 to the spreader 24 which rotates in the same direction as the said wheel 21. When the parts are arranged as above described the said spreader operates as an over-cast. To reverse the rotation of the said spreader the sprocket chain 23 is passed from the sprocket wheel 20 under the lower side of the sprocket wheel 16 then back to the wheel 20, over the sprocket wheel 19 as indicated by dotted lines in Fig. 1. Thus, as the wheels 16 is operated in one direction the sprocket wheels 20 and 21 are rotated in the same direction as is also the spreader 24. When the spreader 24 rotates in the same direction as that in which the sprocket wheel 16 is rotated the said spreader operates upon the material as an under-cast. When operating as an under-cast the spreader 24 may move vertically with its shaft 25 in the arcuate grooves 27 as a guide. This permits the spreader to ride over any obstruction in the material that it cannot rend asunder without injury to the machinery. As the sprocket wheel 16 rotates the roller-projections 34 are brought successively into lateral contact with the curved end 33 of the lever 32 and thus each roller projection 34 lifts the curved end of the said lever and the pawl 35 mounted upon the lever and being in engagement with the ratchets of the wheel 30, the said wheel and shaft 31 is partially rotated. The ratchet 36 retains the said wheel 30 against reverse rotation. Thus the shaft 31 is rotated by degrees or stages and the conveyer, made up of the chains 51 and slats 52 is moved longitudinally of the bottom 5 of the body 1, the upper portion of the said conveyer moving toward the spreader 24. Thus it is that the slats 52 are swept along the top of the bottom 5 and the material is brought toward the spreader 24. The movement of the lever 32 may be governed by an operator upon the seat 13 through the lever 46, rod 40 and chain 37. Thus the conveyer at the bottom of the body 1 may be moved at will at greater or less degrees as desired. When the lever 46 is thrown forward as far as possible the curved end 33 of the lever 32 is carried entirely beyond the path of the roller projections 34 and thus the wheel 30 and shaft 31 will remain at rest while the wheel 15 may rotate. At the same time, the stop 42 engages the eye 44 of the rocker 43 and moves the rods 45 longitudinally against the tension of the springs 45'. The rods 45 have obliquely disposed portions at their rear ends which engage the clutch 17 so that the wheel 16 will be out of gear with relation to the wheel 15 as the rods 45 are moved rearwardly. Thus the spreader operating means and the conveyer operating means may be simultaneously thrown out of gear. As the material that is brought back toward the spreader 24 by the cross slats 52 approaches the said spreader it rides up upon the spring teeth of the comb 53 and is slightly vated above the bottom 5 when it comes contact with the pins 26 of the said spreader. Thus should the said pins 26 come in contact with tough lumps or chunks of the material the teeth of the comb 53 will give slightly so that the said teeth 26 may partially rend or tear the said chunks or lumps without jarring the machinery or adding to the stress upon the draft animal. The said chunks or lumps will eventually be torn by the teeth 26 to such an extent as to be able to pass between the spreader and the bottom side of the body 1. As the slats 52 move toward the spreader 24 they ride over the comb 53 and depress the same. The free end of the said comb, however, by reason of its resiliency and inherent tension will remain generally disposed toward the spreader 24. When the said comb 53 is depressed into an almost horizontal position it comes in contact with the supplemental comb 56 which is under tension and has a tendency to maintain the free end of the comb 53 toward the spreader 24 even after a slat 52 has passed along for considerable distance of the length of the teeth constituting the comb 53. The intensity with which the comb 56 may operate as an assistant or temporary support for the comb 53 may be regulated by turning the shaft 57 so that the said comb 56 may be moved into a position more or less inclined. After the shaft 57 is turned into proper position it is held against rotation by the nuts 58 screw threaded upon the ends thereof and which bear against the edges of the bottom 5.

Having described my invention what I claim as new and desire to secure by Letters-Patent is:—

1. A compost spreader comprising a body, a wheel mounted axle supporting the same, a conveyer mounted for movement at the bottom of the body, a spreader located at the end of the body, a sprocket wheel journaled for rotation upon the axle and being operatively connected with the spreader and having spaced projections, a lever operatively connected with the conveyer and having an end lying in the path of said projections.

2. A compost spreader comprising a wheel mounted body, a spreader mounted at the end of the body, means operatively connecting said spreader with the wheel of the body, a wheel journaled for rotation with the body supporting wheel and having lateral projections, a conveyer mounted for movement at the bottom of the body, and a lever operatively connected with said conveyer and having an end lying in the path of said projections, and means for adjusting the extent to which said lever may traverse the path of the projection.

3. A compost spreader comprising a body, a conveyer mounted for movement at the bottom thereof, a spreader mounted at the end thereof, said conveyer having cross slats and said spreader having pins, a comb attached to the bottom of the body and being made up of spring teeth which are disposed toward the spreader and over which said cross slats pass.

4. A compost spreader comprising a body, a conveyer having cross slats mounted for movement at the bottom thereof, a spreader journaled for rotation at the end of the body, a comb attached to the bottom of the body and being made up of spring teeth disposed toward the spreader and a similar comb attached to the bottom of the body under the first said comb.

5. A compost spreader comprising a body, a conveyer having cross slats mounted for movement longitudinally of the body, a spreader journaled for rotation at the end of the body, a spring comb attached to the bottom of the body and being disposed toward the spreader, a similar comb attached to the bottom of the body and being located under the first said comb and means for adjusting the angle of inclination of the last said comb with relation to the bottom of the body.

6. A compost spreader comprising a body, a conveyer mounted for movement at the bottom thereof, a spreader mounted for vertical movement at the rear of the body, means for revolving the spreader so that the under side of said spreader will move in the same direction as the upper side of the conveyer, a comb attached to the bottom of the body disposed toward the spreader with means for adjusting the angle of said comb.

In testimony that I claim the foregoing as my own, I have hereto affixed my signature in the presence of witnesses.

HENRY A. ARNOLD.

Witnesses:
E. D. BUTTON,
FRANKLIN J. TYRRELL,
BESSIE HAMLET.